(12) United States Patent
Ueno et al.

(10) Patent No.: US 6,983,949 B2
(45) Date of Patent: Jan. 10, 2006

(54) BICYCLE HEADSET STRUCTURE

(75) Inventors: Koken Ueno, Sakai (JP); Hiroyuki Miyoshi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/848,569

(22) Filed: May 19, 2004

(65) Prior Publication Data

US 2005/0258617 A1    Nov. 24, 2005

(51) Int. Cl.
B62K 21/18    (2006.01)
(52) U.S. Cl. ...................................... 280/279
(58) Field of Classification Search ................ 280/279, 280/280; 74/489, 502.6
See application file for complete search history.

(56) References Cited

U.S. PATENT DOCUMENTS

| | | |
|---|---|---|
| 4,274,301 A | 6/1981 | Katayama |
| 4,310,260 A | 1/1982 | Katayama |
| 4,435,983 A | 3/1984 | Shimano |
| 4,489,307 A | 12/1984 | Nagano |
| 4,653,768 A * | 3/1987 | Keys et al. ................. 280/279 |
| 4,770,435 A * | 9/1988 | Cristie ........................ 280/279 |
| 4,881,750 A | 11/1989 | Hartmann |
| 4,966,047 A * | 10/1990 | Krauer et al. .............. 74/502.2 |
| 5,095,770 A | 3/1992 | Rader, III |
| 5,097,928 A | 3/1992 | Enders et al. |
| 5,248,159 A | 9/1993 | Moore |
| 5,305,654 A | 4/1994 | Durham |
| 5,319,993 A | 6/1994 | Chiang |
| 5,330,220 A | 7/1994 | Nagano |
| 5,496,126 A | 3/1996 | Lin |
| 5,647,684 A | 7/1997 | Chen |
| 5,681,119 A | 10/1997 | Marui |
| 5,800,071 A | 9/1998 | Chi |
| 5,826,898 A | 10/1998 | Fortier et al. |
| 5,918,895 A | 7/1999 | Chi |
| 5,927,740 A | 7/1999 | Hopey |
| 5,971,116 A | 10/1999 | Franklin |
| 6,019,017 A | 2/2000 | Lin |
| 6,122,991 A * | 9/2000 | Clarkson ................... 74/551.8 |
| 6,145,637 A | 11/2000 | Hopey |

(Continued)

FOREIGN PATENT DOCUMENTS

| CH | WO 90/13470 | * 11/1990 |
|---|---|---|
| JP | 62-40868 U | 10/1987 |

OTHER PUBLICATIONS

U.S. Appl. No. 10/663,990, Shimano.

(Continued)

Primary Examiner—Lesley D. Morris
Assistant Examiner—Daniel Yeagley
(74) Attorney, Agent, or Firm—Shinjyu Global IP Counselors, LLP

(57) ABSTRACT

A bicycle headset structure is provided to aid in concealment of wiring from components mounted in the handlebar area to components mounted on the rest of the bicycle. The bicycle headset structure basically comprises a handlebar attachment member and a tubular spacer member. The handlebar attachment member has wiring passage extends between the handlebar mounting portion and the steerer tube attachment portion. The tubular spacer member has a wiring channel extending between first and second ends of the tubular spacer member and an axial passageway extending axially between the upper and lower end openings of the tubular spacer member. The axial passageway is dimensioned to receive the bicycle steerer tube. The wiring channel is arranged to communicate with the wiring passage of handlebar attachment member when the handlebar attachment member and the tubular spacer member are attached to the bicycle steerer tube.

12 Claims, 5 Drawing Sheets

U.S. PATENT DOCUMENTS

| | | | |
|---|---|---|---|
| 6,149,174 A | 11/2000 | Bohn | |
| 6,167,780 B1 | 1/2001 | Chen | |
| 6,220,398 B1 * | 4/2001 | Wu | 188/24.11 |
| 6,343,806 B1 | 2/2002 | Lee | |
| 6,416,071 B2 | 7/2002 | Marui | |
| 6,543,799 B2 | 4/2003 | Miyoshi | |
| 6,612,599 B2 | 9/2003 | Miyoshi | |
| 2003/0140727 A1 | 7/2003 | Chuang | |
| 2003/0230228 A1 * | 12/2003 | Kinoshita | 116/28 R |
| 2004/0188976 A1 * | 9/2004 | Schmider | 280/279 |
| 2005/0057017 A1 * | 3/2005 | Hara et al. | 280/279 |

OTHER PUBLICATIONS

U.S. Appl. No. 10/699,833, Shimano.
U.S. Appl. No. 10/702,605, Shimano.

* cited by examiner

BICYCLE HEADSET STRUCTURE

BACKGROUND OF THE INVENTION

1. Field of the Invention

This invention generally relates to a bicycle headset structure for a bicycle. More specifically, the present invention relates to a bicycle headset structure configured to provide a wiring channel from a handlebar attachment member to a bicycle frame portion such that a wire can extend through a head tube of a bicycle frame in a concealed manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, bicycles have been equipped with electrical components to make riding easier and more enjoyable for the rider. Some bicycles are equipped with computer controlled components. For example, many new bicycles have automatic shifting units that are automatically adjusted according to the riding conditions by a cycle computer or control unit. Also, some bicycles have automatic suspensions that are automatically adjusted according to the riding conditions by a cycle computer or control unit.

Accordingly, these bicycles with electrical components need to be equipped with control devices for controlling the various electrical components and one or more batteries for supplying electrical power to the various electrical components. Unfortunately, there is a limited amount of space on a bicycle frame to mount all of these electronic components such that the rider has access to the electronic components. In other words, these electronic components are preferably mounted in particular areas of the bicycle such as the handlebar, which further limits the mounting areas for the electronic components. Also it is desirable to mount the electronic components in such a manner as to be attractive and easy to use. Thus, it is desirable to mount the electronic components in such a manner that the wires do not interfere with the operation of the bicycle and the wires do not detract from the appearance of the bicycle.

In view of the above, it will be apparent to those skilled in the art from this disclosure that there exists a need for an improved bicycle headset structure. This invention addresses this need in the art as well as other needs, which will become apparent to those skilled in the art from this disclosure.

SUMMARY OF THE INVENTION

One object of certain embodiments of the present invention is to provide a bicycle headset structure that is configured provide an unobstructed passageway or channel through the head tube of the bicycle frame for passing wires from components mounted in the handlebar area to components mounted on the rest of the bicycle.

Another object of certain embodiments of the present invention is to provide a bicycle headset structure that is relatively inexpensive to manufacture and relatively simple to install.

The foregoing objects can basically be attained by providing a bicycle headset structure that basically comprises a handlebar attachment member and a tubular spacer member. The handlebar attachment member has a handlebar mounting portion configured to secure a bicycle handlebar thereto and a steerer tube attachment portion configured to secure a bicycle steerer tube thereto. A wiring passage extends between the handlebar mounting portion and the steerer tube attachment portion. The tubular spacer member has a first end with an upper end opening, a second end with a lower end opening, a wiring channel extending between the first and second ends of the tubular spacer member and an axial passageway extending axially between the upper and lower end openings of the tubular spacer member. The axial passageway is dimensioned to receive the bicycle steerer tube. The wiring channel is arranged to communicate with the wiring passage of handlebar attachment member when the handlebar attachment member and the tubular spacer member are attached to the bicycle steerer tube.

The foregoing objects can also basically be attained by providing a tubular spacer member for use in a bicycle headset structure disposed under a handlebar attachment member. The tubular spacer member basically comprises a first end portion, a second end portion, a central passageway, and a wiring channel. The first end portion is provided with an upper end opening. The second end portion is provided with a lower end opening. The central passageway extends axially between the upper and lower end openings and is dimensioned to receive a bicycle steerer tube therein. The wiring channel extends from one of the upper and lower end openings towards the other one of the upper and lower end openings. The wiring channel is arranged to form a space outside of an outer peripheral surface of the bicycle steerer tube when the tubular spacer member is attached to the bicycle steerer tube.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
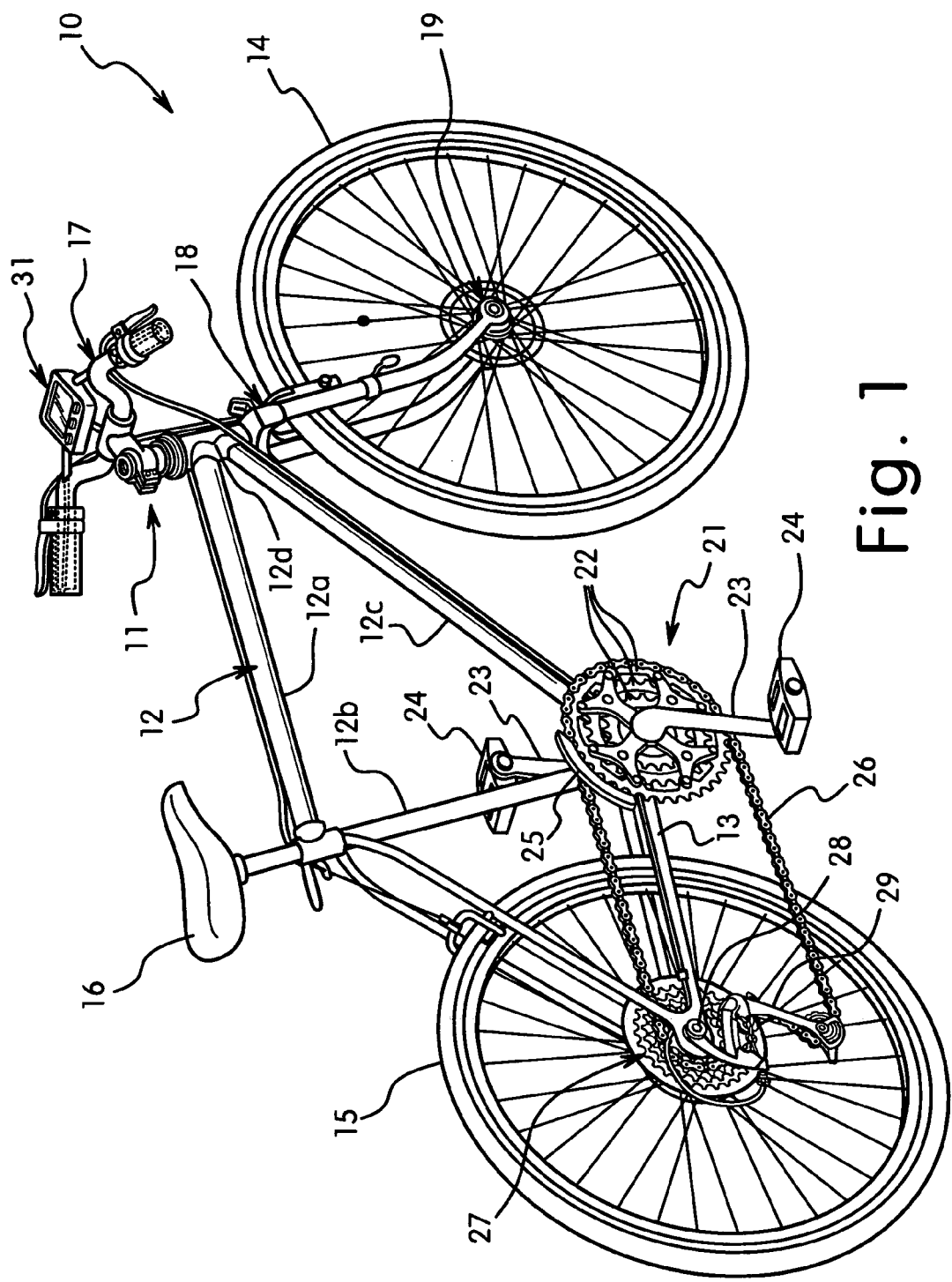
FIG. 1 is a rear side perspective view of a bicycle that is equipped with a bicycle headset structure in accordance with one embodiment of the present invention.

Referring initially to FIG. 1, a bicycle 10 is illustrated that is equipped with a bicycle headset structure 11 and various electronic components in such a manner as to carryout a first embodiment of the present invention as discussed below. Also as used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

As seen in FIG. 1, the bicycle 10 basically includes a main frame 12, a rear chain stay 13, a front wheel 14 and a rear wheel 15. The main frame 12 is also equipped with a seat 16, a handlebar 17 and a front fork 18 that rotatably supports the front wheel 14 via a front dynamo hub 19 of the front wheel 14. Thus, the front wheel 14 is rotatably mounted to the front fork 18 by the front dynamo hub 19 in conventional manner. The main frame 12 basically includes a top tube 12a, a seat tube 12b, a down tube 12c and a head tube 12d. The rear wheel 15 is rotatably mounted to the rear chain stay 13, which in turn is coupled to the main frame 12 at the bottom bracket.

Figure 2:
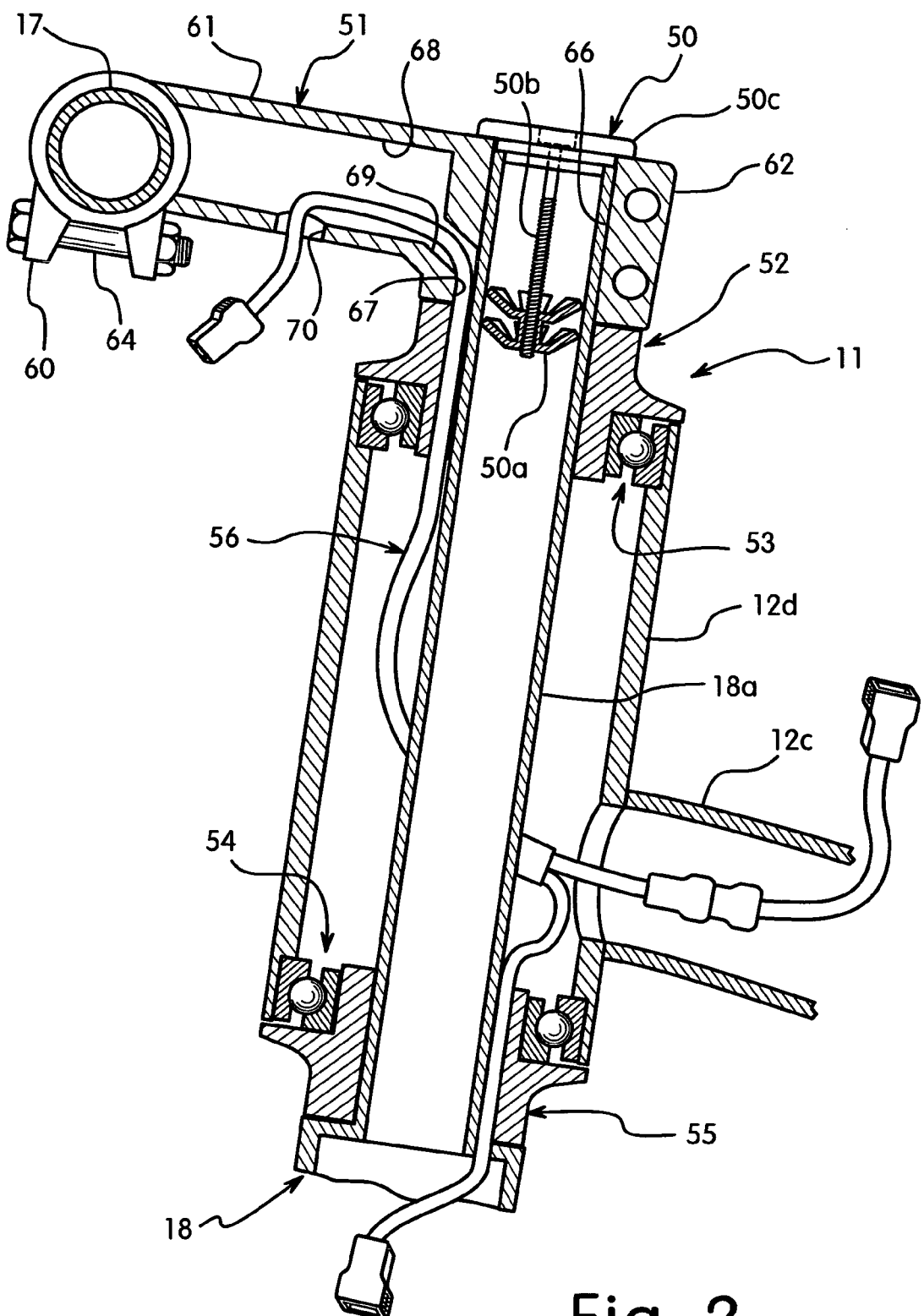
FIG. 2 is an enlarged, partial side cross-sectional view of a top portion of the bicycle headset structure illustrated in FIG. 1 in accordance with the present invention.

As seen in FIGS. 1 and 2, an upper end of the front fork 18 is movably coupled to the head tube 12d of the main frame 12, while the lower end of the front fork 18 is coupled to the axle of the front dynamo hub 19. As seen in FIGS. 1 and 2, the front fork 18 basically includes a steerer tube 18a that is rotatably mounted in the head tube 12d of the main frame 12 by the bicycle headset structure 11. Thus, the handlebar 17 is fixed to the front fork 18 for turning the front fork 18 and the front wheel 14 relative to the main frame 12.

Referring back to FIG. 1, the bicycle 10 further includes a drive train 21 that basically includes a plurality of front chain rings or sprockets 22 mounted on a bottom bracket (not shown), a pair of crank arms 23 with a pair of pedals 24, an electric front derailleur 25 mounted on the bottom bracket (not shown), a drive chain 26, a plurality of rear sprockets 27 coupled to a rear hub 28 of the rear wheel 15 in a conventional manner, and an electric rear derailleur 29 mounted to the rear chain stay 13. Since these parts of bicycle 10 are well known in the art, these parts will not be discussed or illustrated in detail herein, except as they are modified to be used in conjunction with the present invention. Moreover, various conventional bicycle parts such as brakes, etc., which are not illustrated and/or discussed herein, are also used in conjunction with the present invention as needed and/or desired.

Figure 3:
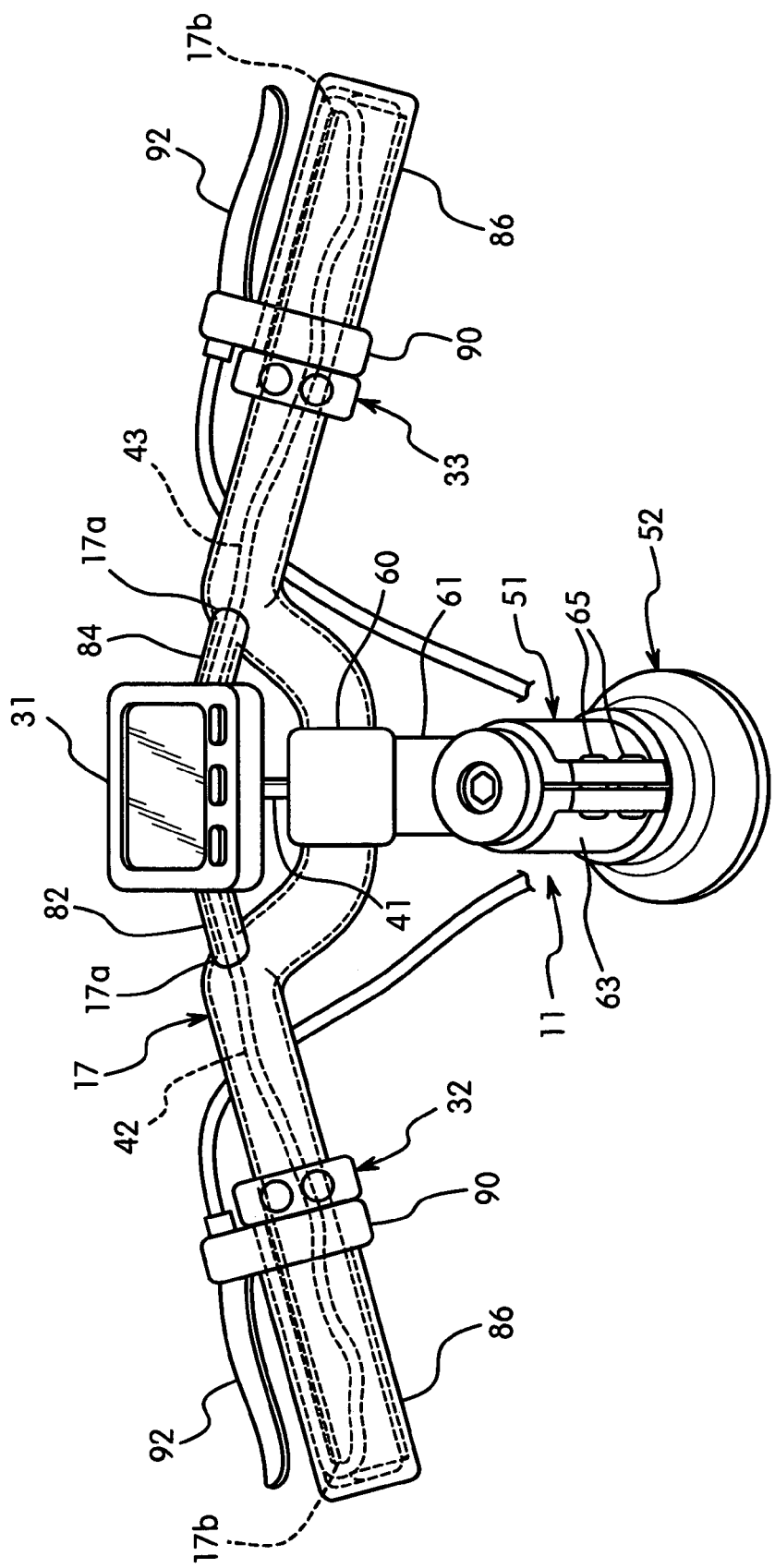
FIG. 3 is a partial top perspective view of a front portion of the bicycle illustrated in FIGS. 1 and 2, which further illustrates the bicycle headset structure in accordance with the present invention.

As seen in FIG. 3, the bicycle 10 is equipped with various electronic control components that are mounted on the handlebar 17. In particular, the bicycle 10 is equipped with a cycle computer 31, a front electronic shifter 32 and a rear electronic shifter 33. The cycle computer 31 is electrically coupled to various electronic components including, but not limited to, the front dynamo hub 19, the front electronic shifter 32 and the rear electronic shifter 33. For example, the bicycle 10 can be equipped with front and/or rear electric dampening suspensions that can be electrically coupled to cycle computer 31. The cycle computer 31 is preferably electrically coupled to these various electronic components by a main electrical cable or cord 41 that splits into several feed wires or cords (only two electrical cords will be illustrated in FIG. 2 for the sake of simplicity and for easy of illustration) and a pair of electrical shift cables or cords 42 and 43. The cords 41, 42 and 43 are multi-conductor cords that each includes a plurality of electrical conductors. Examples of various electronic control components that can be used with the present invention are the Nexave C-910 components that are sold by Shimano Inc.

The cycle computer 31 includes a plurality of push buttons for operating the automatic shifting control. In the illustrated embodiment, as seen in FIG. 2, the cycle computer 31 is electrically coupled to the electric derailleurs 25 and 29 by the main electrical cable or cord 41, while the cycle computer 31 is electrically coupled to the electronic shifters 32 and 33 by the electrical shift cords 42 and 43, respectively.

The cycle computer 31 is preferably configured and arranged with control programs stored for controlling the automatic shifting based on the rider input commands and/or riding conditions from sensors (not shown). Alternatively, the cycle computer 31 preferably includes a microcomputer with a control program that controls the automatic shifting control. The cycle computer 31 can also include other conventional components such as an input interface circuit, an output interface circuit, and storage devices such as a ROM (Read Only Memory) device and a RAM (Random Access Memory) device. The microcomputer of the cycle computer 31 is programmed to display various information such as the status of the various components as well as programmed to control automatic shifting control. The memory circuit stores processing results and control programs that are run by the processor circuit.

Turning back to FIG. 2, the bicycle headset structure 11 basically includes a stem bolt or steerer tube fastening member 50, a handlebar attachment member 51, a top tubular spacer member 52, a top steerer bearing set 53, a bottom steerer bearing set 54 and a bottom tubular spacer member 55. The bicycle headset structure 11 also preferably includes an internal headset wiring cable or cord 56 that is electrically coupled at one end to the main electrical cord 41 and splits into two sections at the other end for connection with front and rear devices or components.

In the present invention, the bicycle headset structure 11 is mounted on the steerer tube 18a of the front fork 18 such that the steerer tube 18a can freely rotate within the head tube 12d. Thus, as seen in FIG. 2, the handlebar 17 is fixed to the steerer tube 18a of the front fork 18 by the handlebar attachment member 51 in a conventional manner. In other words, the handlebar 17 is fixed to the front fork 18 for turning the front fork 18 and the front wheel 14 relative to the main frame 12.

In particular, the top tubular spacer member 52 supports an upper end of the steerer tube 18a to the upper end of the head tube 12d via the top bearing set 53 for rotational movement, while the bottom tubular spacer member 55 supports a lower end of the steerer tube 18*a* to the lower end of the head tube 12*d* via the bottom bearing set 54 for rotational movement. Thus, the top and bottom bearing sets 53 and 54 are disposed between the top and bottom tubular spacer members 52 and 55 and the upper and lower ends of the head tube 12*d*, respectively.

In assembling the bicycle headset structure 11, the top and bottom bearing sets 53 and 54 are installed with the top and bottom tubular spacer members 52 and 55 onto the upper and lower ends of the head tube 12*d*. Then, the steerer tube 18*a* is inserted into the head tube 12*d* such that the steerer tube 18*a* is rotatably supported in the head tube 12*d* by the top and bottom tubular spacer members 52 and 55. Next, the handlebar attachment member 51 is inserted onto the upper free end of the steerer tube 18*a*. Before the handlebar attachment member 51 is fixedly clamped (i.e., loosely installed) to the steerer tube 18*a*, the stem bolt 50 is inserted into the interior of the steerer tube 18*a* and adjusted to apply an axial force that pulls the steerer tube 18*a* upwardly and pushes the handlebar attachment member 51 downwardly to axially load the top and bottom bearing sets 53 and 54. Thus, the bicycle headset structure 11 is configured and arranged to exert a downward pressure or force on the handlebar attachment member 51, which in turn exert a downward pressure or axial force of the top and bottom bearing sets 53 and 54. This axial force on the bicycle headset structure 11 allows the user to apply an appropriate load to the top and bottom bearing sets 53 and 54.

As seen in FIG. 2, the handlebar attachment member 51 has a handlebar mounting portion 60 configured to secure the bicycle handlebar 17 thereto, an intermediate extension portion 61 and a steerer tube attachment portion 62 configured to secure the bicycle steerer tube 18*a* thereto. The handlebar mounting portion 60 is configured as a tube clamp that is constricted by a fastener 64, e.g. a bolt and a nut. Similarly, the steerer tube attachment portion 62 is configured as a tube clamp that is constricted by a pair of fasteners 65, e.g. a pair of bolt and a pair of nut. Thus, the steerer tube attachment portion 62 has a radially contractible bore 66 that is dimensioned to receive the bicycle steerer tube 18*a*. The radially contractible bore 66 has a notch 67 that forms a portion of a wiring passage of the handlebar attachment member 51.

The intermediate extension portion 61 is preferably at least partially hollow to form a wiring passage 68 of the handlebar attachment member 51. The wiring passage 68 has a first wiring aperture 69 that opens to the notch 67 of the steerer tube attachment portion 62, and a second wiring aperture 70 that opens to the bottom of the intermediate extension portion 61. Thus, the main electrical cord 41 is electrically connected to the internal headset wiring cord 56 through the second wiring aperture 70. Of course, the main electrical cord 41 and the internal headset wiring cord 56 can be a single integral cord, as needed and/or desired.

As seen in FIG. 2, the top and bottom tubular spacer members 52 and 55 are preferably each constructed as a one-piece, unitary member from a hard rigid material. More preferably, the top and bottom tubular spacer members 52 and 55 are constructed of a metallic material suitable for bicycles. The top and bottom tubular spacer members 52 and 55 are identical to each other, but the bottom tubular spacer member 55 is inverted relative to the top tubular spacer member 52. Thus, only the top tubular spacer member 52 will be discussed or illustrated in detail.

Figure 4:
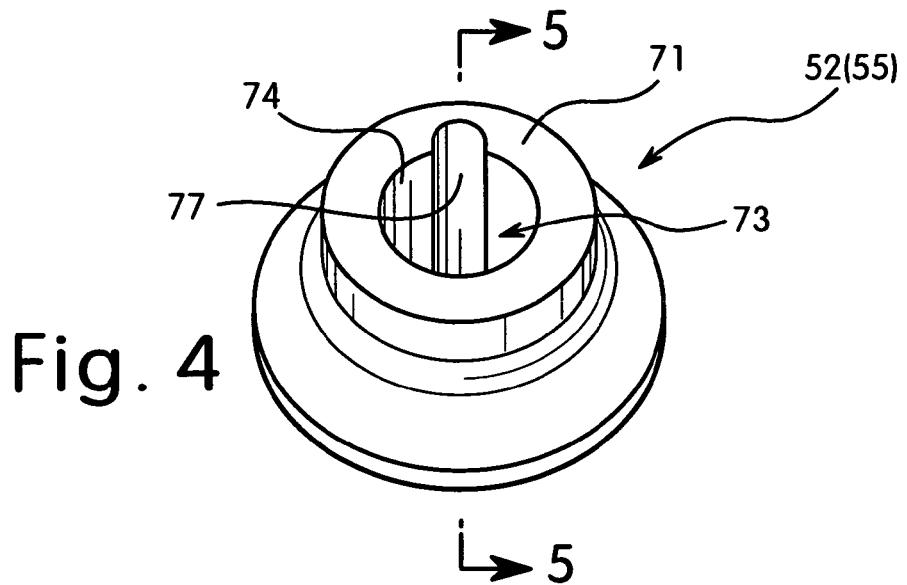
FIG. 4 is a top perspective view of the tubular spacer member of the bicycle headset structure illustrated in FIGS. 1–3 in accordance with the present invention.
Figure 5:
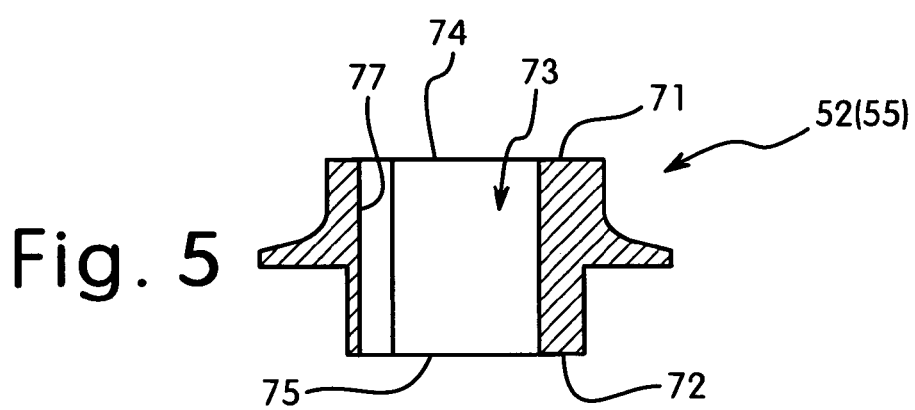
FIG. 5 is a longitudinal cross-sectional view of the tubular spacer member of the bicycle headset structure illustrated in FIGS. 1–4 as seen along section line 5—5 in accordance with the present invention.
Figure 6:
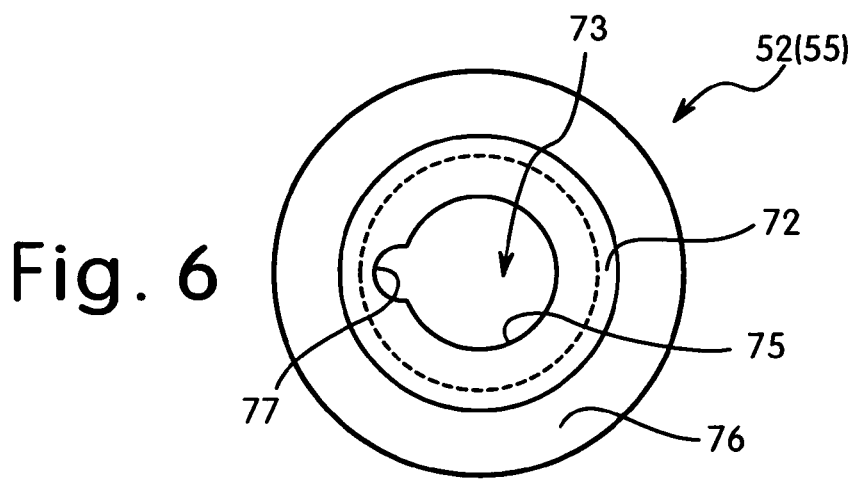
FIG. 6 is a bottom plan view of the bottom end opening of the tubular spacer member of the bicycle headset structure illustrated in FIGS. 1–5 in accordance with the present invention.
Figure 7:
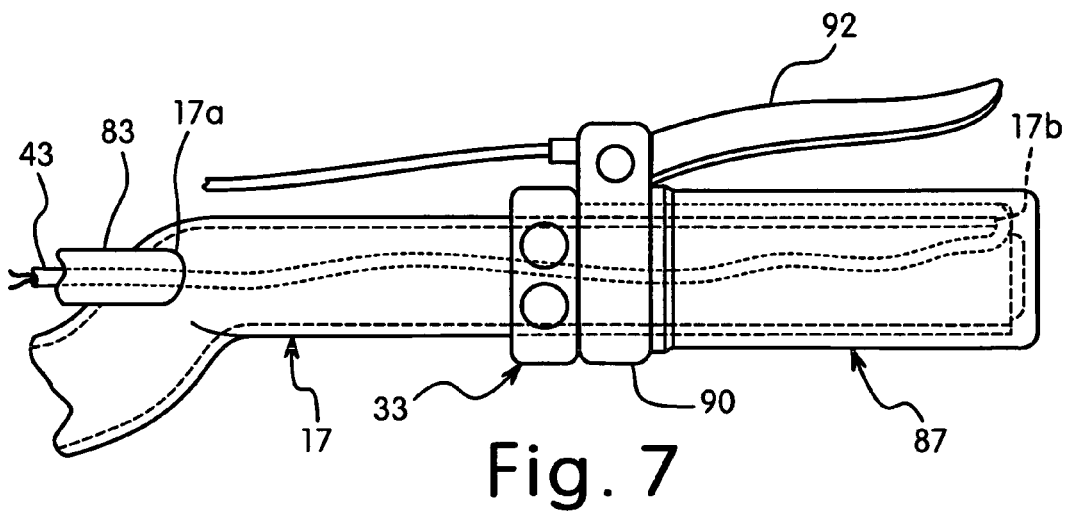
FIG. 7 is an enlarged, partial top view of the right portion of the handlebar utilizing the present invention.
Figures 8, 9:
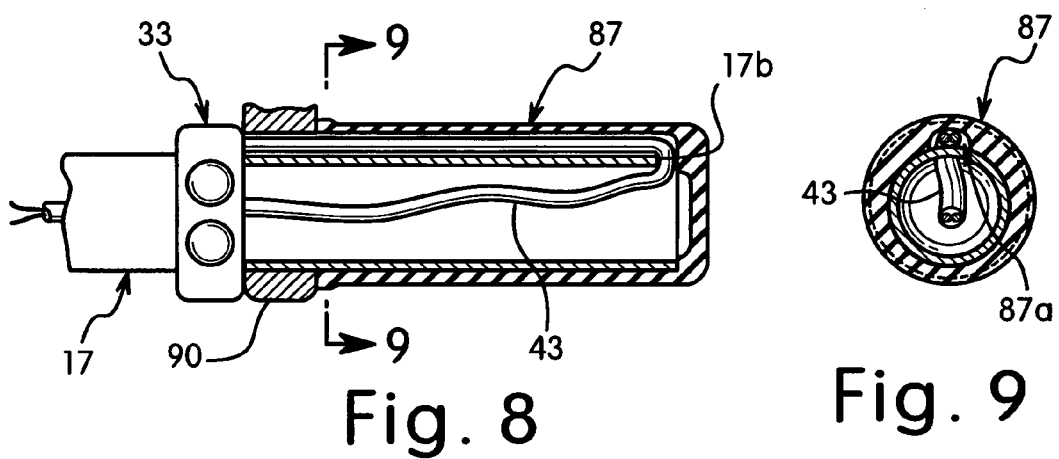
FIG. 8 is a side view of the right end portion handlebar with selected portions shown in longitudinal cross section.
FIG. 9 is a transverse cross section of the right end portion handlebar as seen along section line 9—9 of FIG. 8.
Figures 10, 11:
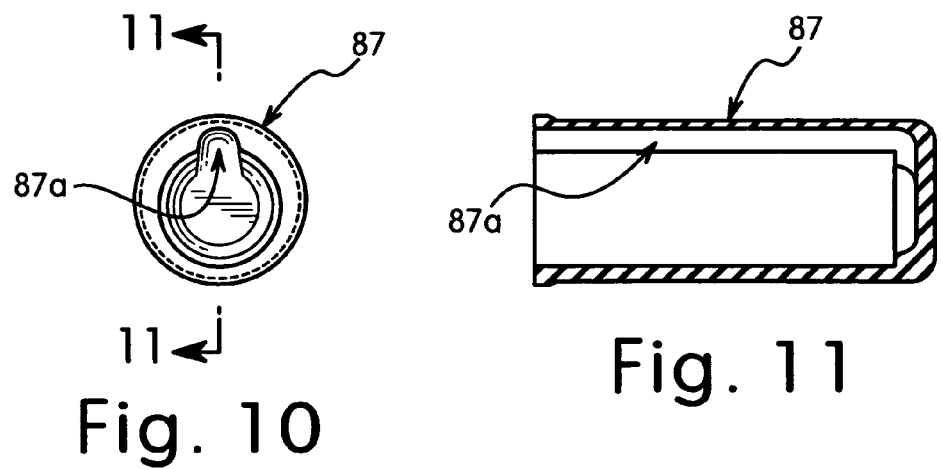
FIG. 10 is an end elevational view of the right hand grip used with the present invention.
FIG. 11 is a longitudinal cross section of the right hand grip shown in FIGS. 7–10 in accordance with the present invention.

As seen in FIGS. 4–6, the top tubular spacer member 52 has a first end portion 71 and a second end portion 72 with a central axial passageway 73 extending between the first and second end portions 71 and 72. Thus, the first end portion 71 has a first or upper end opening 74, while the second end portion 72 has a second or lower end opening 75. The central axial passageway 73 is dimensioned to receive the bicycle steerer tube 18*a*. Preferably, the central axial passageway 73 has a generally cylindrical interior surface.

The outer surface of the top tubular spacer member 52 is preferably step shaped to support the top steerer bearing set 53. In particular, the first (upper) end portion 71 of the top tubular spacer member 52 has a first annular section with a first maximum width, while the second (lower) end portion 72 of the top tubular spacer member 52 has a second annular section with a second maximum width that is smaller than the first maximum width such that an axially facing abutment 76 is formed therebetween. The top steerer bearing set 53 is supported on the second (lower) end portion 72 of the top tubular spacer member 52 and contacts the axially facing abutment 76.

A wiring channel 77 extends longitudinally between the first and second ends of the tubular spacer member 52. Preferably, wiring channel 77 is an axially extending notch that is formed in the generally cylindrical interior surface of the central axial passageway 73. The wiring channel 77 is arranged to communicate with the notch 67 and the wiring passage 68 of the handlebar attachment member 51 when the handlebar attachment member 51 and the top tubular spacer member 52 are attached to the bicycle steerer tube 18*a*. Thus, the internal headset wiring cord 56 can pass from the handlebar attachment member 51 into the head tube 12*d* such that the internal headset wiring cord 56 will move with the steerer tube 18*a*.

Referring back to FIG. 2, the stem bolt or steerer tube fastening member 50 is a relatively conventional structure that includes an expandable nut 50*a* dimensioned to engage an interior bore of the bicycle steerer tube 18*a* and a bolt 50*b* threadedly coupled to the expandable nut 50*a*. The bolt 50*b* including a head portion 50*c* that dimensioned to engage the steerer tube attachment portion 62 of the handlebar attachment member 51.

Referring now to FIGS. 3 and 7–11, the wiring from the cycle computer 31 to the electronic shifters 32 and 33 that are mounted on the handlebar 17 will now be explained. Preferably, the handlebar 17 has a pair of protective tubes 82 and 84 to protect the shift cords 42 and 43, respectively. The protective tubes 82 and 84 from the cycle computer 31 into openings 17*a* of the handlebar 17 to protect the shift cords 42 and 43, respectively.

In the preferred embodiment, the shift cords 42 and 43 extend through the hollow interior of the handlebar ends, and then wrap around the free ends of the handlebar 17 so as to loop back on the outside of the handlebar 17 where they are connected to the electronic shifters 32 and 33. In the preferred embodiment, the handlebar 17 is provided with left and right handlebar grips 86 to hold the shift cords 42 and 43 in place. Basically, the hand grips 86 are identical. Thus, only one of the hand grips 86 will be discussed and illustrated in detail herein.

Preferably, the free ends of the handlebar 17 are provided with notches 17*b* for accommodating the wires 42 and 43. In other words, when the shift cords 42 and 43 wrap around the free end of the handlebar 17, the shift cords 42 and 43 are located in the notches 17*b*. Thus, when the grips 86 are inserted onto the ends of the handlebar 17, the shift cords 42 and 43 are not crimped by the grips 86. Moreover, the grips 86 are preferably each provided with a longitudinally extending groove 87*a* such that the shift cords 42 and 43 can be disposed in the longitudinal grooves 87*a* when the grips 86 are installed on the free ends of the handlebar 17. Preferably, the brake mounting portion 90 of the brake levers 92 have a similar type cross section to the grips 86 so that the shift cords 42 and 43 can pass between the mounting portions 90 of the brake levers 92 and the exterior surface of the handlebar 17.

The front shifting unit 32 includes a pair of shifting push buttons for manually shifting the front derailleur 25 when the cycle computer 31 has been set by the rider to a manual mode. In the illustrated embodiment, as seen in FIG. 3, the front shifting unit 32 is electrically coupled to the cycle computer 31 by the electrical cord 42. In the preferred embodiment, the front shifting unit 32 inputs electrical commands to the cycle computer 31.

The rear shifting unit 33 includes a pair of shifting push buttons for manually shifting the rear derailleur 29 when the cycle computer 31 has been programmed or set by the rider to a manual mode. In the illustrated embodiment, the rear shifting unit 33 is electrically coupled to the cycle computer 31 by the electrical cord 43. In the preferred embodiment, the rear shifting unit 33 inputs electrical commands to the cycle computer 31.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle headset structure comprising:
    a handlebar attachment member having a handlebar mounting portion configured to secure a bicycle handlebar thereto and a steerer tube attachment portion configured to secure a bicycle steerer tube thereto, with a wiring passage extending between the handlebar mounting portion and the steerer tube attachment portion; and
    a tubular spacer member having a first end with an upper end opening, a second end with a lower end opening, a wiring channel extending between the first and second ends of the tubular spacer member and an axial passageway extending axially between the upper and lower end openings of the tubular spacer member, the axial passageway being dimensioned to receive the bicycle steerer tube, the wiring channel being arranged to communicate with the wiring passage of the handlebar attachment member when the handlebar attachment member and the tubular spacer member are attached to the bicycle steerer tube;
    the axial passageway having a generally cylindrical interior surface with the wiring channel being an axially extending notch formed in the generally cylindrical interior surface of the axial passageway.

2. The bicycle headset structure according to claim 1, wherein
    the steerer tube attachment portion includes a radially contractible bore that is dimensioned to receive the bicycle steerer tube.

3. The bicycle headset structure according to claim 2, wherein
    the radially contractible bore has a notch that forms a portion of the wiring passage of the handlebar attachment member.

4. A bicycle headset structure comprising:
    a handlebar attachment member having a handlebar mounting portion configured to secure a bicycle handlebar thereto and a steerer tube attachment portion configured to secure a bicycle steerer tube thereto, with a wiring passage extending between the handlebar mounting portion and the steerer tube attachment portion the steerer tube attachment portion having a steerer tube receiving opening that is adjustable in size in order to fixedly attach the steerer tube therein; and
    a tubular spacer member having a first end with an upper end opening, a second end with a lower end opening, a wiring channel extending between the first and second ends of the tubular spacer member and an axial passageway extending axially between the upper and lower end openings of the tubular spacer member, the axial passageway being dimensioned to receive the bicycle steerer tube, the wiring channel being arranged to communicate with the wiring passage of the handlebar attachment member when the handlebar attachment member and the tubular spacer member are attached to the bicycle steerer tube;
    the handlebar attachment member including an interior hollow area extending between the handlebar mounting portion and the steerer tube attachment portion with a first wire access opening formed in the steerer tube attachment portion and a second wire access opening longitudinally spaced from the first wire access opening toward the handlebar mounting portion from the steerer tube attachment portion such that the first and second wire access opening communicate with each other through the interior hollow area.

5. The bicycle headset structure according to claim 4, further comprising
    a steerer tube fastening member including an expandable nut dimensioned to engage an interior bore of the bicycle steerer tube and a bolt threadedly coupled to the expandable nut, the bolt including a head portion that dimensioned to engage the steerer tube attachment portion of the handlebar attachment member.

6. The bicycle headset structure according to claim 4, wherein
    the tubular spacer member has a first annular section with a first maximum width and a second annular section with a second maximum width that is smaller than the first maximum width such that an axially facing abutment is formed therebetween.

7. The bicycle headset structure according to claim 4, further comprising
    a head tube including a bearing for engaging the tubular spacer member.

8. The bicycle headset structure according to claim 7, wherein
    the tubular spacer member has a first annular section with a first maximum width and a second annular section with a second maximum width that is smaller than the first maximum width such that an axially facing abutment is formed therebetween that contacts the bearing.

9. A tubular spacer member for use in a bicycle headset structure disposed under a handlebar attachment member, comprising:
    a first end portion with an upper end opening;
    a second end portion with a lower end opening;

a central passageway extending axially between the upper and lower end openings and dimensioned to receive a bicycle steerer tube therein; and a wiring channel extending from one of the upper and lower end openings towards the other one of the upper and lower end openings, the wiring channel being arranged to form a space outside of an outer peripheral surface of the bicycle steerer tube when the tubular spacer member is attached to the bicycle steerer tube, the central passageway having an interior surface with the wiring channel being a notch formed in the interior surface of the central passageway.

10. The tubular spacer member according to claim 9, wherein the second end portion has a first annular section with a first maximum width and a second annular section with a second maximum width that is smaller than the first maximum width such that an axially facing abutment is formed therebetween.

11. A tubular spacer member for use in a bicycle headset structure disposed under a handlebar attachment member, comprising:

a first end portion with an upper end opening;

a second end portion with a lower end opening;

a central passageway extending axially between the upper and lower end openings and dimensioned to receive a bicycle steerer tube therein; and a wiring channel extending from one of the upper and lower end openings towards the other one of the upper and lower end openings, the wiring channel being arranged to form a space outside of an outer peripheral surface of the bicycle steerer tube when the tubular spacer member is attached to the bicycle steerer tube;

the central passageway having a generally cylindrical interior surface with the wiring channel being an axially extending notch formed in the generally cylindrical interior surface of the central passageway.

12. The tubular spacer member according to claim 11, wherein the second end portion has a first annular section with a first maximum width and a second annular section with a second maximum width that is smaller than the first maximum width such that an axially facing abutment is formed therebetween.

* * * * *